D. C. Westfall.
Horse Collar Fastening.
No. 69,520. Patented Oct. 1. 1867.
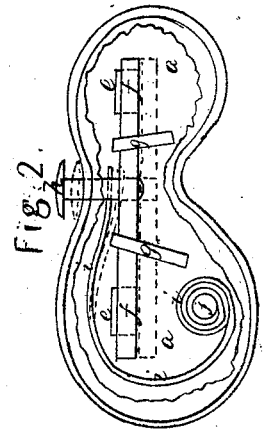
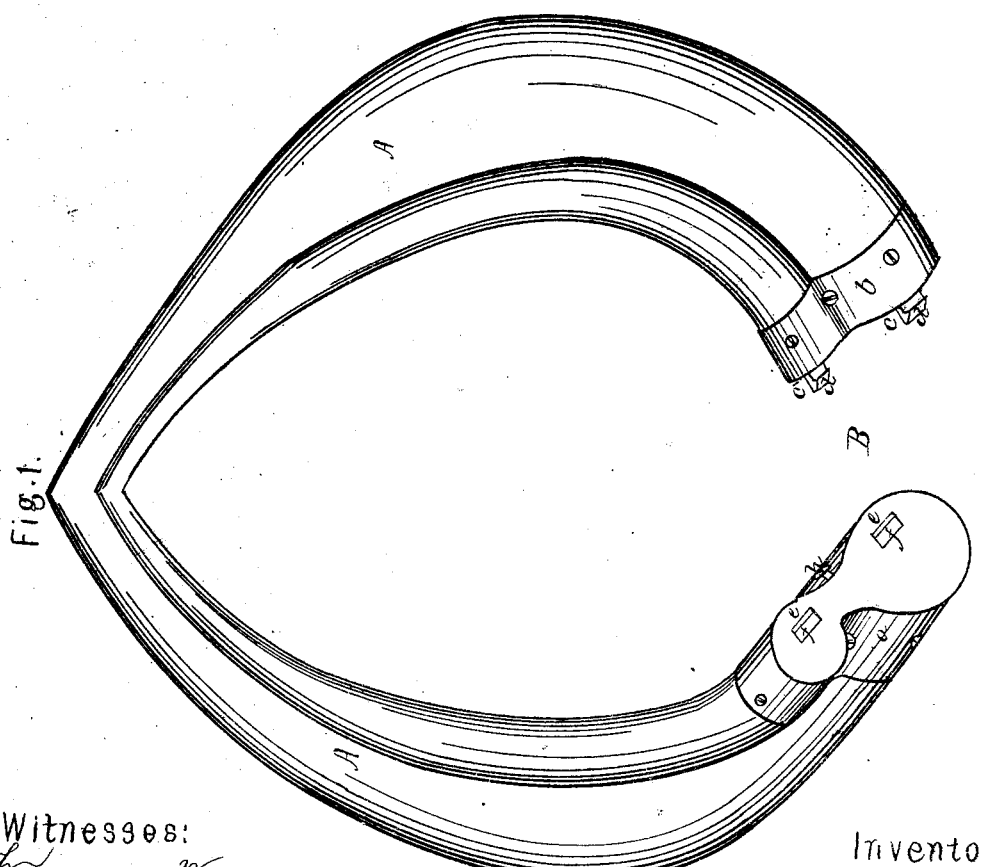
Witnesses:
William Wenz
D. Ourand
Inventor:
Daniel C. Westfall
By Wiedersheim & Co.
Attorneys

United States Patent Office.

DANIEL C. WESTFALL OF MIFFLIN, PENNSYLVANIA

Letters Patent No. 69,520, dated October 1, 1867.

IMPROVED HORSE-COLLAR FASTENING.

The Schedule referred to in these Letters Patent and making part of the same.

TO ALL WHOM IT MAY CONCERN:

Be it known that I, DANIEL C. WESTFALL, of Mifflin, in the county of Juniata, and State of Pennsylvania, have invented a new and improved Horse-Collar Fastening; and I do hereby declare the following to be a full and correct description of the same, sufficient to enable others skilled in the art to which my invention appertains to understand and construct the same, reference being had to the accompanying drawings, which make part of this specification, and in which—

Figure 1 is a perspective view of a horse-collar with my invention attached, and Figure 2 is an inside view of the part $a$, with the inner covering-plate removed.

Similar letters of reference indicate corresponding parts in the several figures.

The nature of my invention consists in providing the lower ends of a horse-collar with a novel locking device in such a manner that any person, even a child who can reach high enough, can place a collar on a horse and lock it, without being obliged to pass it over the horse's neck or to buckle it.

A, in the drawings, may represent a horse-collar separated at its lower part, as shown at B. Each end is provided with a metal cap, $a$ and $b$, which correspond to the shape of the collar, and is attached to the same by means of screws or in any other suitable manner. On the cap $b$ are formed projections $c$, provided with hook-shaped flanges $d$. The face of the cap $a$ has two square openings, $e$, into which the projections $c$ of the cap $b$ fit, and in which they are held by the bar $f$, which catches behind the flanges $d$. This bar $f$ slides between staples $g$, and has attached to it a thumb-piece, $h$, which passes through the inner side of the cap $a$. A spiral spring, $i$, is secured at $j$, and passes around the bar $f$ into and through the thumb-piece $h$, keeping the bar $f$ in an elevated position. Any other kind of a spring may, however, be used for the purpose, such as a round or flat one bearing against the ends of the bar.

To secure the collar on the horse it is but necessary to press the two ends together; the inclined flanges $d$ of the projections $c$, on passing into the openings $e$, elevate the bar $f$, and allow the caps $a$ and $b$ to come in close contact, when the bar $f$ falls into the recess formed by the flanges $d$, and thus locks the collar. To unclasp it the thumb-piece $h$ is pressed downward, which allows the projections $c$ to pass out of the openings $e$, clear of the bar $f$. It will be seen that the hollow caps receive the ends of the collar A, and protect the same. The caps are bent or formed with grooves for the distance of their length, so as to receive the hames, which are passed around the collar, and when the parts are locked they fit snugly, hold securely, and are likewise ornamental in appearance.

Having thus described my invention, what I claim as new, and desire to secure by Letters Patent, is—

The horse-collar fastening, consisting of grooved hollow caps for receiving and concealing the ends of the collar, forming a bearing for the hames, and concealing in one part the spring sliding-bar $f$, which catches over the bevel hooked projections of the other part, when constructed and operating as herein represented and described.

The above specification of my improved horse-collar fastening signed this nineteenth day of June, 1867.

D. C. WESTFALL.

Witnesses:
D. OURAND,
C. DAVIS.